(12) United States Patent
Anderson et al.

(10) Patent No.: US 7,689,842 B2
(45) Date of Patent: Mar. 30, 2010

(54) ALWAYS READY COMPUTING DEVICE

(75) Inventors: Jason Michael Anderson, Snoqualmie, WA (US); William Jefferson Westerinen, Sammamish, WA (US); Tony Dwayne Pierce, Bellevue, WA (US); Allen Marshall, Woodinville, WA (US); Peter Viscaraola, Mount Vernon, NH (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/017,155

(22) Filed: Jan. 21, 2008

(65) Prior Publication Data

US 2008/0178022 A1 Jul. 24, 2008

Related U.S. Application Data

(63) Continuation of application No. 10/837,728, filed on May 3, 2004, now Pat. No. 7,321,974, which is a continuation-in-part of application No. 10/780,039, filed on Feb. 17, 2004, now abandoned.

(51) Int. Cl.
*G06F 1/26* (2006.01)
(52) U.S. Cl. .......................... 713/310; 713/300; 713/324
(58) Field of Classification Search .................. 713/300, 713/310, 324
See application file for complete search history.

(56) References Cited

U.S. PATENT DOCUMENTS

| 4,860,005 | A | 8/1989 | DeLuca et al. |
| 5,831,849 | A | 11/1998 | Matsui |
| 5,922,075 | A | 7/1999 | Bowker |
| 6,016,548 | A | 1/2000 | Nakamura et al. |
| 6,243,656 | B1 | 6/2001 | Arai et al. |
| 6,259,172 | B1 | 7/2001 | Lee |
| 6,285,406 | B1 | 9/2001 | Brusky |
| 6,457,082 | B1 | 9/2002 | Zhang et al. |
| 6,608,476 | B1 | 8/2003 | Mirov et al. |

(Continued)

FOREIGN PATENT DOCUMENTS

| EP | 1359494 A | 11/2003 |
| WO | 03100589 A | 12/2003 |

OTHER PUBLICATIONS

In the United States Patent and Trademark Office, Final Office Action in re:. U.S. Appl. No. 10/780,039, filed Feb. 17, 2004, Dated Nov. 27, 2006, 13 pages.
In the United States Patent and Trademark Office, Non-Final Office Action in re:. U.S. Appl. No. 10/780,039, filed Feb. 17, 2004, Dated Aug. 11, 2006, 13 pages.
In the United States Patent and Trademark Office, Notice of Allowance in re:. U.S. Appl. No. 10/837,728, filed May 3, 2004, Dated Aug. 28, 2007, 6 pages.

(Continued)

*Primary Examiner*—Tse Chen
(74) *Attorney, Agent, or Firm*—Woodcock Washburn LLP

(57) ABSTRACT

Systems and methods for producing a simulated off condition in a computing device using a set of software drivers that interact with a system service and the device BIOS. The computing device includes system components such as a power supply, processors and fans that are put into a low power state upon receiving a signal to power off the device. This provides the appearance to users that the computing device is off. The system components, however, remain enabled to run applications when the computing device is in the simulated off condition. If necessary, the device can be returned to a fully on condition to process applications that require the system components to be brought out of the low power state to execute.

10 Claims, 8 Drawing Sheets

U.S. PATENT DOCUMENTS

| | | |
|---|---|---|
| 6,618,813 B1 | 9/2003 | Hsu et al. |
| 6,760,850 B1 * | 7/2004 | Atkinson et al. ............ 713/320 |
| 6,930,795 B1 | 8/2005 | Motamed et al. |
| 2002/0178390 A1 | 11/2002 | Lee |
| 2003/0236945 A1 * | 12/2003 | Nahum ....................... 711/114 |
| 2004/0025071 A1 | 2/2004 | Vicard |
| 2005/0057954 A1 * | 3/2005 | Sultenfuss et al. .......... 365/145 |

OTHER PUBLICATIONS

In the United States Patent and Trademark Office, Non-Final Office Action in re:. U.S. Appl. No. 10/837,728, filed May 3, 2004, Dated Apr. 18, 2007, 10 pages.

* cited by examiner

ALWAYS READY COMPUTING DEVICE

CROSS-REFERENCE TO RELATED APPLICATIONS

This application is a continuation of U.S. patent application Ser. No. 10/837,728 filed May 3, 2004 entitled "Always Reading Computing Device," which is a continuation-in-part of U.S. patent application Ser. No. 10/780,039, filed Feb. 17, 2004 both of which are herein incorporated by reference in their entirety.

FIELD OF THE INVENTION

This invention relates in general to the field of power management. More particularly, this invention relates to a system and method of controlling power usage by individual components within a computing device in order to reduce acoustic emissions to simulate an OFF condition while remaining in an ON state to run applications.

BACKGROUND OF THE INVENTION

As the functionality of PCs begins to converge with that of consumer electronics (CE) devices such as personal-video recording (e.g., digital video recorders (DVR), eHome PCs, etc.), PCs will likely move from locations such as the den or home office into the living room, so they can be connected to a home entertainment center (e.g., TV, stereo receiver, set-top box, etc.). This move creates a challenge for the PC, in that users will expect very high reliability and ease of use, similar to CE devices. Expectations for PCs have historically been much lower than CE devices because PCs have been difficult to use and prone to stability problems that have to do with both hardware and software. Thus, to succeed in the CE space, the PC must behave more like an appliance and less like a conventional PC.

PCs also differ significantly from CE devices with regard to powering ON and OFF. Conventionally, to be instantly available from an off state, the PC is placed into a low-power standby state (ACPI S3). Typically, this low-power state enables the PC to power on in less than two seconds. However, while the PC is in the low-power state, the only action it can perform is waking the system to a fully "on" state (ACPI S0) such that the PC may perform other functions. In addition, the latency between S3 and "on" depends on many factors, both hardware and software. Although it might take less than two seconds to power on one time, it might take five or seven seconds the next. For this reason, the PC low-power standby state cannot provide the instant-on behavior that users expect from a CE device.

Thus, there is a need for an improved system for restoring a PC to a fully "on" state from a reduced power state, wherein the PC may perform certain functions in the reduce power state. The present invention provides such a solution.

SUMMARY OF THE INVENTION

The present invention is directed to systems and methods for providing a simulated off condition in a computing device. In accordance with a first aspect, there is provided a method of creating a simulated off condition in a computing device via a set of software extensions. The method includes providing a device driver for each component to be managed, providing a policy driver to coordinate information from device drivers to determine a power state of the computing device, receiving a signal to change the power state of the computing device, and instructing system components to change their respective power states in accordance with the signal. If the signal is representative of a request to enter a low power state, the power consumption of the system components are reduced such that the computing device enters a simulated off state. However, the computing system remains at a fully on and system components remain enabled to run applications when the computing device is in the simulated off condition. If the signal is representative to a request to enter a fully on power state, then the system is returned to the fully on power state.

In accordance with features of the invention, human interface devices are locked by discarding inputs, and a predefined input sequence may be detected that represents the signal noted above. In addition, the policy may periodically poll each device driver for state information. Also, a system service may be provided that instructs processors within the system to clock-down to a lowest state, discontinues a display signal to turn off a monitor, reduces a power supply output, turns off cooling fans, and indicates that the computing device is in the simulated off condition.

In accordance with another aspect of the invention, there is provided a computing device having a simulated off state. The device includes a power supply having a power supply heat sink having a first fin orientation matching a direction airflow through the power supply and first cross-cuts to induce airflow turbulence, a central processing unit having a CPU heat sink having a bimetallic outer portion and base, a graphics processing unit having a GPU heat sink having a second fin orientation matching a direction airflow over the graphics processing unit and second cross-cuts to induce airflow turbulence, a hard disk drive, and a random access memory. When the computing device is powered down, the computing device is placed into the simulated off state by placing the system components into a low power state such that the computing device appears to be off. In accordance with this aspect of the invention, the computing device remains enabled to run applications when in the simulated off state.

In accordance with another aspect of the invention, there is provided a method of producing a simulated off condition in a computing device when the computing device is in an ACPI S0 state. The method includes providing a device driver for each component to be managed, providing a policy driver to coordinate information from device drivers to determine a power state of the computing device, receiving a signal to change the power state of the computing device, and instructing system components to change their respective power states in accordance with the signal. If the signal is representative of a request to enter a low power state, the power consumption of the system components is reduced using ACPI methods such that the computing device enters a simulated off state. The computing system remains at a fully on and system components remain enabled to run applications when the computing device is in the simulated off condition. However, if the signal is representative to a request to enter a fully on power state, the system components are returned to the fully on power state using ACPI methods.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
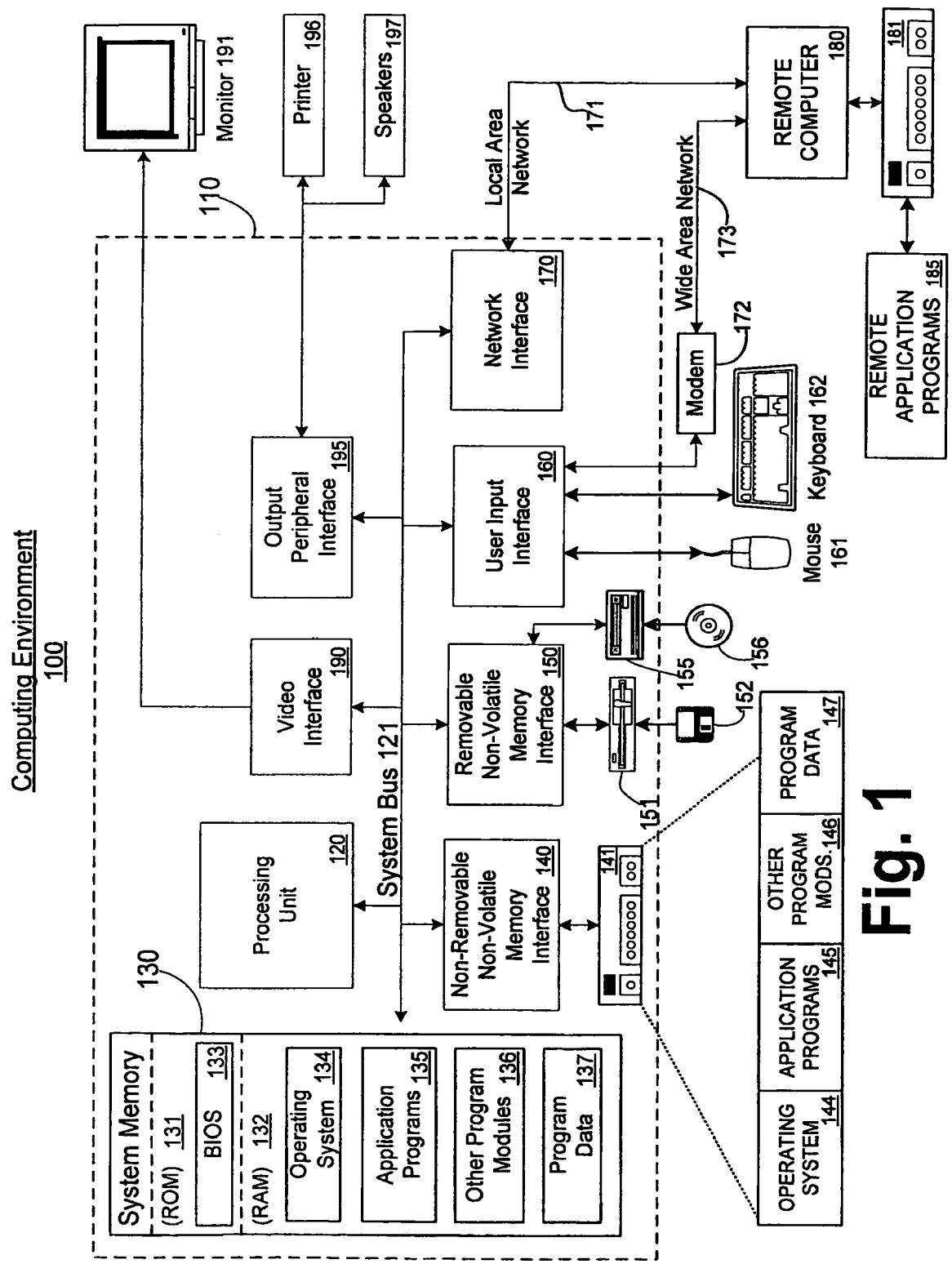
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of the Always Ready Computing Device

Modern PC operating systems, such as WINDOWS XP available from Microsoft Corp., Redmond, Wash., have the ability to control the amount of power that certain components of the system draw through Advanced Configuration and Power Interface (ACPI) methods. Such components include, but are not limited to, the CPU, graphics processor (GPU), monitor, hard disk drives, power supplies, cooling fans, etc. This has the benefit of reducing power utilization to make the system more energy efficient, while also reducing acoustic emissions from cooling fans. Particularly, the largest noise contributors in PCs today are the cooling fans, including CPU fans, GPU fans, power supply fans, and system case fans. As devices draw less power and emit less heat, the need to actively dissipate heat through fans is reduced, thus lowering acoustic emissions. In order for PCs to gain acceptance in the living room, these sources of noise will need to be significantly reduced.

The present invention is directed to a PC system having a "smart off" state (a simulated off state) wherein the PC remains in an "on" state (ACPI S0) while appearing to the user to be "off." In accordance with the present invention, when the power button ("smart off power button") on a PC is pressed (either on the system case, through a remote control, or keyboard or mouse action), the system registers the "off" event and instead of signaling the operating system to enter an ACPI state (e.g., S1, S3, S4 or S5) other than the current running state (S0), a series of power management triggers are set to power down system components such as the CPU, GPU, monitor, fans, etc. through custom software and ACPI methods. Thus, the PC is "always on" and ready to perform tasks. Alternatively, the present invention may first enter the "smart off" state, and then after a predetermined period of time, transition to S3. In this case, when some event occurs (e.g., the PC is tasked as a PVR, etc), the system wakes from S3 to "smart off" (i.e., the monitor is off, audio is muted, etc) and performs the task and then returns to S3 after a period of inactivity.

This technique makes for a system that is unobtrusive and appears "off" in many ways while being able to process low intensity tasks. The system may turn itself back "on" as needed to accomplish higher intensity tasks. For example, if the user turned the PC off, but scheduled a TV program to be recorded at a predetermined time while at the same time another user is streaming media from the PC, the PC may turn itself back "on" to provide the processing power and cooling necessary to accomplish these tasks. The system could then be programmed to turn itself back "off" after the task has completed.

In accordance with the present invention, five "pseudo-off" states within S0 are contemplated, as follows:

(1) On with user interaction. This state is when the user is interacting with the system by watching TV, playing music, watching a DVD, etc. This could also include any other typical PC use such as word processing or internet browsing.

(2) Smart Off. As noted above, this state is entered when the user is finished with their entertainment or computing experience and presses the "off" button on the PC. The PC remains in the S0 state, but all devices are clocked down, all cooling fans are stopped, input devices such as mice and keyboards are locked, etc., indicating to the user that the device is off. Because of the reduced clocking, the system is in a lower power state than in state (1) and able to be cooled via passive cooling.

(3) Smart Off with user interaction. In this state, the user is able perform certain tasks on the PC without fully "waking" from Smart Off to state (1). For example, "Smart Off" provides enough processing power to carry out music playback. It may be preferable that user is able to play audio on their PC without the fans or monitor turning on. In this instance, the PC may include a front-panel display similar to those used on DVD/CD players to indicate what track is playing, time remaining, etc.

(4) On without user interaction. This state is entered, for example, after the PC was in state (2), but was required to return to state (1) without the screen coming back on. For example, this state could be entered when the system is tasked to record a TV show that requires full CPU or GPU processing (e.g., a personal video recorder (PVR)). This state results in higher acoustic emissions from fans than state (2), but lower acoustic emissions that state (1).

(5) Active Smart Off. This state is similar to state (1), however, the processing workload is small enough that the PC can handle it while remaining in state (2). In this state, the PC processes tasks without turning on the fans and continues to appear off even though it is processing instructions. It is also possible that the PVR scenario noted in the description of state (4) could be accomplished in this state. It may be desirable to light an LED so the user can visually confirm that the task is being accomplished with the PC "off," similar to a VCR lighting up a light indicating that a show is being recorded.

From any of the S0 states noted above, the user will be able to completely shut down the system to S5/G3 state as well. This may be implemented with a second power button or "off switch" (e.g., at the rear of the chassis). In addition, it may be desirable to implement a long push (e.g., 4 sec) of the smart off power button to bring the system to S5/G3. Lastly, the user can still shut down the system using the Operating System's user interface controls.

In accordance with the present invention, the following, non-limiting list of components may be powered down in the following manners to achieve lower acoustic emissions:

CPU

Current CPU technology allows for regulation of frequency and voltage of the CPU during use to vary the power consumption based on system needs. For example, when video is rendered, a 3.06 GHz processor may clock-up to its full frequency and voltage to provide the highest processing power possible, which would equal roughly 90 Watts. When the system is at idle, however, the CPU may clock-down to a much lower voltage and frequency (e.g., sub 800 MHz) which would then only draw approximately 10-35 Watts.

Conventional cooling solutions for CPUs are designed to cool for the highest power possible at all times, so unnecessarily high acoustic emissions result during lower power operations. However, in accordance with the present invention, a heat sink is used for the CPU that may passively cool 35 Watts, or whatever wattage results from the clocked-down frequency the CPU supports, thus the CPU fan may turn completely off when the smart off power button is pressed.

GPU

In much in the same way as a CPU, the cooling solution for most graphics adapters is designed for the highest power utilization scenarios, whether the adapters are discrete or integrated. By implementing the same technique as described for CPUs above, the GPU fan can be turned off when the smart off power button is pressed. In addition to turning off the GPU fan, the video signal may also be immediately removed to provide the appearance on the display that the device is off.

System Case Fans

System case fans are employed to reduce the ambient temperature of the system chassis, which helps to maximize the effectiveness of component fans as well as provide airflow for passively cooled devices in the system. Depending on system load, these fans can be turned off or driven at a very slow speed, which would produce acoustic emissions below the human threshold of hearing.

Hard Disk Drives

Hard disk drive technology has improved to the point where acoustic emissions outside of the PC chassis are not perceptible; however, it is possible to spin down the drive based on inactivity. It is preferable that hard drives continue to spin while the PC is in the smart off state such that the PC will be able perform background functions such as updated system code or downloading media content from a cable feed or the Internet.

Power Supply

By employing the solutions described earlier, the load on the power supply will decrease significantly when the components in the system are placed in lower power states. By reducing the load on the power supply, passive heat sinks of an appropriate size may be used to cool the power supply such that the power supply fan may be turned off during the lower power state.

In accordance with the present invention, the preferred implementation uses software drivers that control the frequency and voltage of the CPU using existing ACPI methods. Similarly, the GPU is controlled through a defined API to throttle down the GPU as requested by the PC operating system. Software drivers may be used to control other components, such as fans and the power supply, etc.

Figure 2:
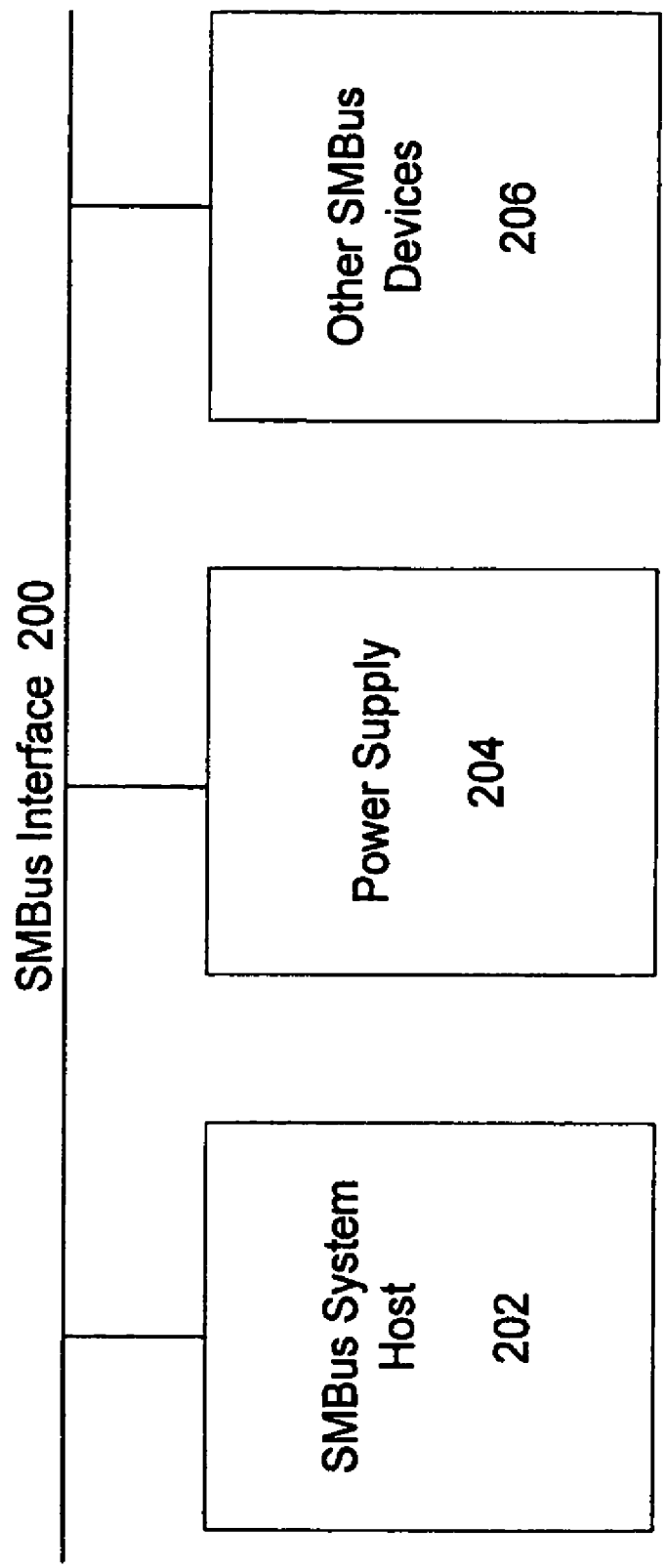
FIG. 2 is a block diagram showing an SMBus Interface and associated components.

The communication protocol used in a preferred implementation is SMBus (Systems Management Bus Interface), which utilizes an existing microcontroller in a power supply. As shown in FIG. 2, through an SMBus Interface 200, various components, including a SMBus system host 202, power supply 204 and other devices 206 can communicate to control the system host fan, buttons, and LEDs. The SMBus interface is described in the "System Management Bus (SMBus) Specification," Version 2.0, Aug. 3, 2000, published by the SBS Implementers Forum, which is incorporated herein by reference in its entirety.

The power supply 204 may consist of a power supply unit that converts AC to DC, a battery, and an integral battery charger. The power supply 204 monitors particular environmental parameters to provide adequate information for power management and charge control regardless of the particular power supply unit's size, or the size and chemistry of the battery. The host 110 to power supply 204 communication is used to get data that is either presented to a user or to the host's 110 power management system. The user may obtain two types of data from the power supply: factual and predictive. Factual data can be measured, such as temperature or battery charge/discharge state, or it can be a battery characteristic, such as the battery's chemistry. Predictive data is calculated, based on the PSU's and battery's present state.

In accordance with the present invention, the power management system may query a device driver to determine if an action will cause harm to the system's integrity. For example, spinning up a disk drive while the power supply 204 is at maximum load may cause its output voltage to drop below acceptable limits, thus causing a system failure. In order to prevent this, the device driver needs information from the power supply that will yield desirable results. If the driver queries the power supply 204 and discovers that not enough power is available, it can then request that the power management system turn off a non-critical power use or change the power/performance operating point of system components.

The power supply 204 has the ability to inform the host 110 of potentially critical conditions. These notifications represent an effort on the part of the power supply 204 to inform the host 110 that power is about to fail or that the battery charge is low. The power supply 204 expects that the user or host 110 will take the appropriate corrective action. Such critical notifications may originate from the power supply 204 using an SMBAlert to signal the host 110 that the power supply 204 state has changed.

Alternatively, the CPU frequency and voltage may be controlled through a hardware mechanism involving microcode in a microcontroller (such as a system BIOS). This could be triggered by the power supply using a control protocol (e.g., SMBus or other control protocol) to notify the CPU to change frequency and voltage based on an event of loss of AC power and/or the presence of DC power (battery power). This implementation does not rely on ACPI and is completely HW/firmware based.

Figure 3:
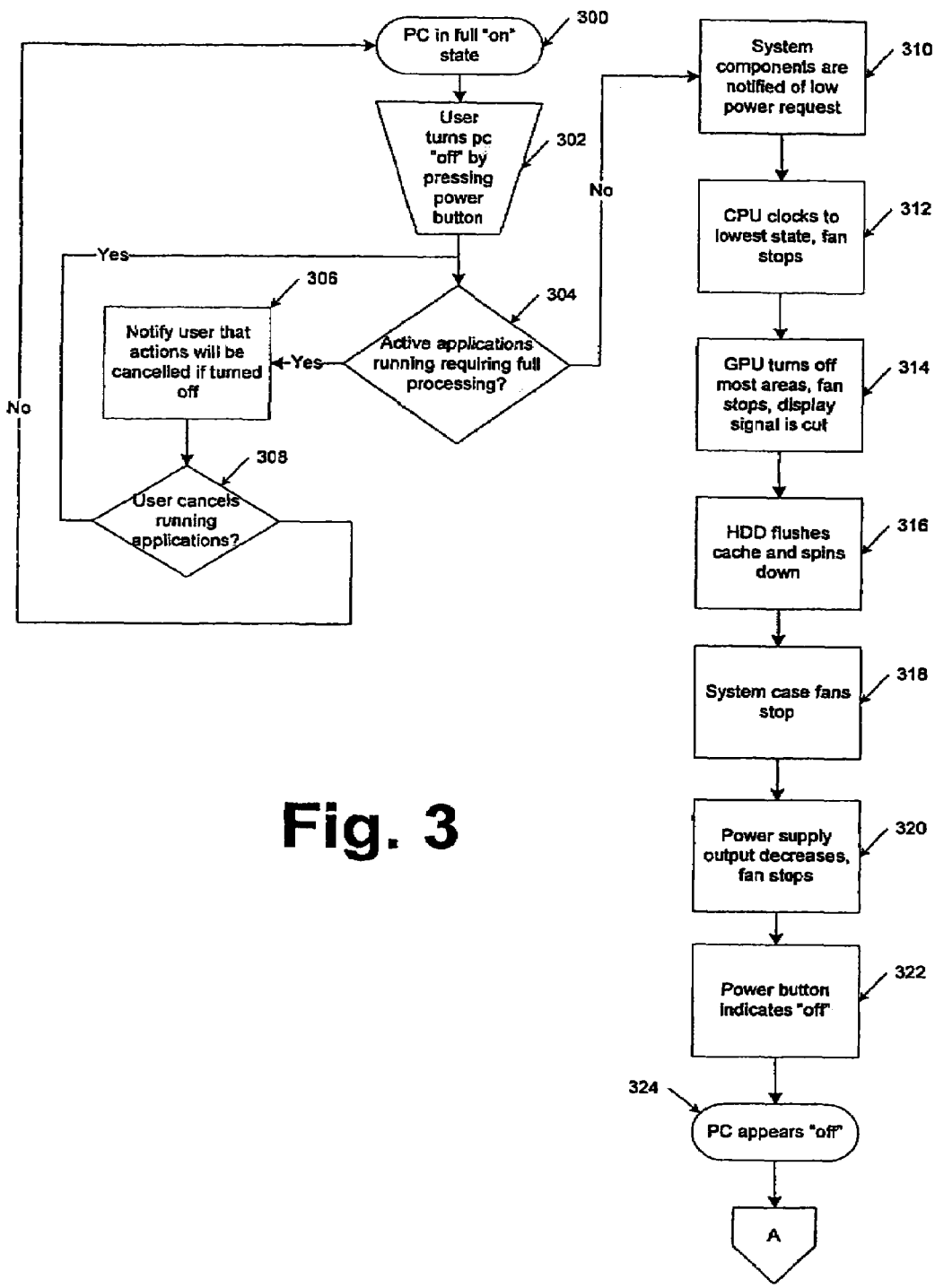
FIGS. 3-4 are flowcharts illustrating the processing of the present invention.
Figure 4:
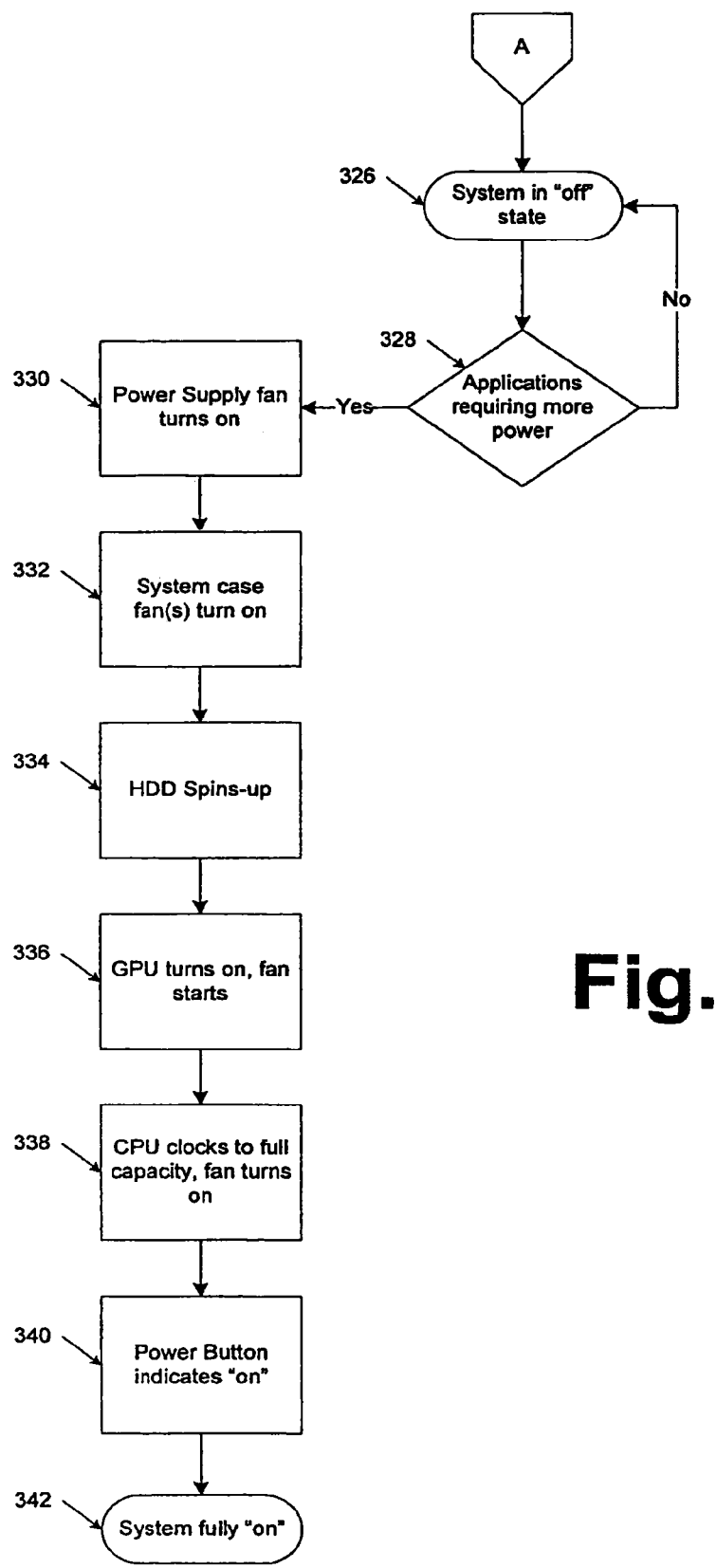

Referring now to FIGS. 3 and 4, there are illustrated flow charts of the transitions between various pseudo-off states within APCI S0 described above. At step 300, the PC is at a fully "on" state, described above as State (1). At step 302, the user has completed his/her interaction with the PC and presses the smart off power button on the PC. At step 304 the system determines if any active applications require full processing power and notifies the user (step 306) that actions will be canceled if the system is turned off. At step 308 the user may cancel the actions noted at step 306, where the process returns to step 304, or may choose not to cancel the actions, where the PC returns to step 300 and remains in the full on state.

If at step 304 the active application do not require full processing power, then at step 310, system components are notified of a low power request. Next, at step 312, the CPU clocks-down to the lowest state and the CPU fan is stopped. At step 314, the GPU turns off, the fan is stopped and the video signal is cut. At step 316, the HDD may flush the cache and spin down to further reduce power consumption. At step 318, the system case fan stops and then the power supply output is decreased and the fan stops at step 320. At step 322, the power button (or case LED) indicates an off state (i.e., Smart Off) such that the PC appears off (step 324).

FIG. 4 illustrates the process of returning to a fully on state when the system is in the smart off state (step 326). At step 328, it is determined if there is an application that requires more power. Such applications may be scheduled or triggered by user interaction. If no applications require more power, then the process returns to step 236. If there are applications that require additional power, then at step 330, the power supply fan turns on, followed by the system case fan at step 332. At step 334, the hard drive spins up and then the GPU and its fan turn on at step 336. At step 338, the CPU clocks-up and it fan turns on. At step 340, the power button then indicates that the PC is on, where by the PC is now at a fully on state (step 342).

Figure 5:
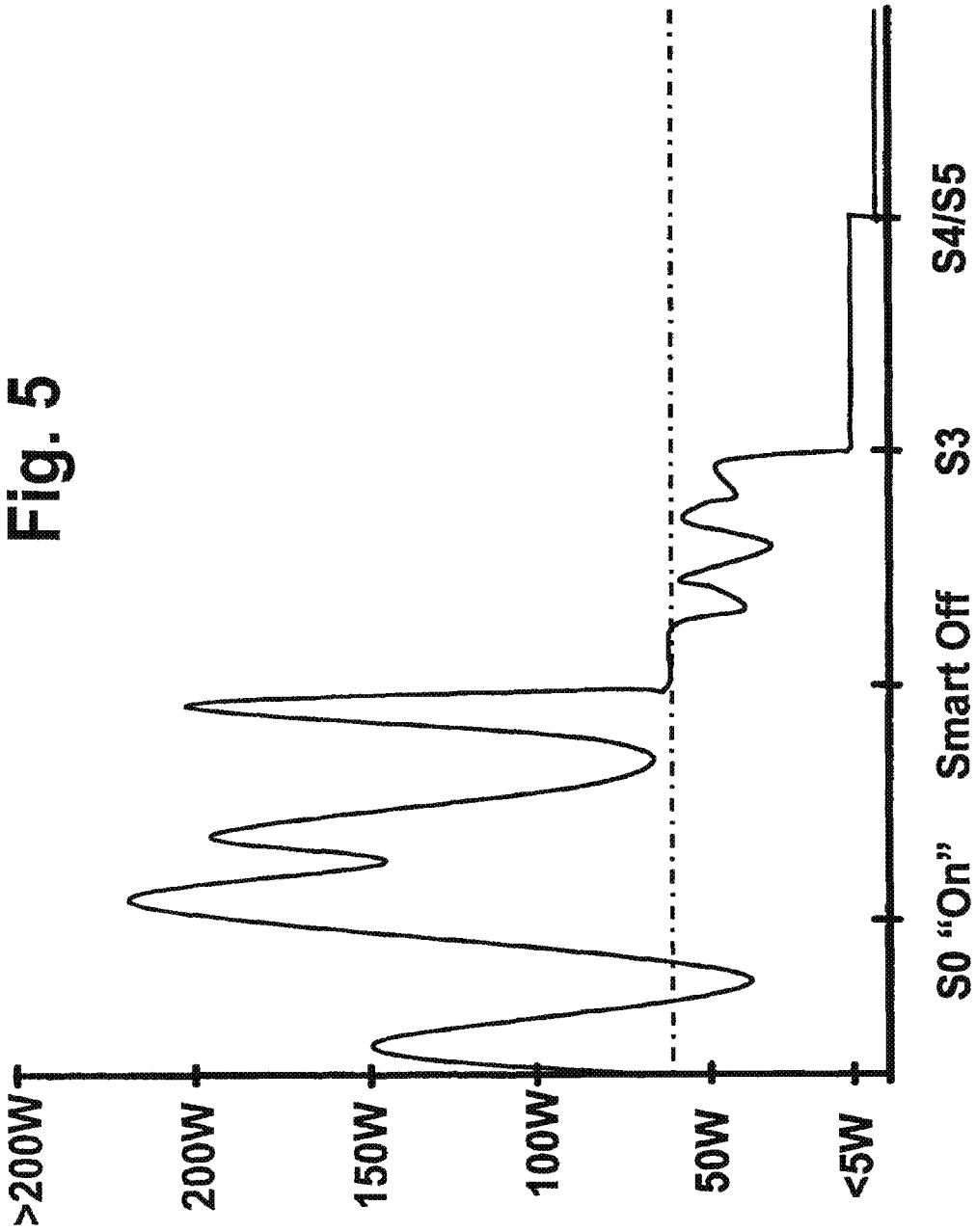
FIG. 5 is a graph of power usage versus ACPI/Smart OFF state in accordance with the present invention.

FIG. 5 illustrates an exemplary graph of power consumption versus APCI/Smart Off state. When the PC is in APCI S0 state, the various components within the PC are allowed to run at full power. Thus, the power consumption of the PC is relatively high, ranging from approximately 50 Watts to over 200 Watts. However, when the user initiates the Smart Off, power consumption is aggressively managed to limit consumption to a threshold value, e.g., 60 Watts (or other amount that can be passively cooled). When in the Smart Off state, the PC remains in S0 and the components are managed such that the total consumption remains below the threshold value. The PC is able to perform processing tasks in this state. When in the Smart Off state, the PC attempts to curtail power below the threshold, while meeting application processing demands. Should the PC be tasked to run applications that require more processing than is possible under the power restrictions of the Smart Off state, the PC components are powered-up and active cooling components reenergized. The PC is thus returned to a full on (S0) state. However, if the user requests that the PC enter other APCI states (S3, S4/S5), power consumption is further reduced and the PC is unable to perform any processing tasks.

An exemplary hardware implementation of an Always Ready Computing Device in accordance with the present invention will now be described. The computing system preferably runs MICROSOFT WINDOWS XP, or higher. A system that implements the Always Ready feature includes a Human Interface Device (HID)-compliant sleep button on the front of the computing device 100, a remote control, and optionally the keyboard 162. For the purposes of this document, the HID-compliant sleep button will be referred to as the "Smart Off button." The Smart Off button is primarily responsible for transitioning the system 100 to Smart Off from S0, and to S0 from Smart Off. In addition, the Smart Off button on the front of the device 100, and optionally on the remote control, can bring the system from the S5 or S4 state to S0.

The following describes how the Smart Off button may be implemented in an Always Ready system, and how it may differ from a conventional HID sleep button. A dedicated USB header is exposed on the motherboard for connecting the USB port to the Smart Off button. To implement this solution, a low cost USB microcontroller may be programmed to be a HID device, supporting the Smart Off function. The USB microcontroller necessary to run the Smart Off button is programmed as a HID device and to send the HID usage code, used for power management. Because Always Ready uses conventional HID usage codes for system control, the Smart Off button can be configured using power management if the Always Ready software is later removed.

Because the Smart Off button is not wired directly to the power management controller of the Super I/O chip, it normally does not have the ability to perform any operations until the operating system loads. To enable the Smart Off button to perform a boot operation from S4 or S5, the motherboard supports "remote power on" through USB. To perform this function, the motherboard's chipset is configured for "Wake on USB" for the USB port, on which the Smart Off button on the chassis of the PC is connected. If the remote control receiver is hard-wired to a USB port internally rather than through an external connection, this port could also be enabled to wake the system. However, to save power when the system is in S4 or S5, it is preferable that only the port in which the Smart Off button is connected is configured for wake on USB, rather than all ports.

If the motherboard's chipset does not support Wake on USB after an AC power loss, then both motherboard's chipset and the system should support and be configured for Power-up on AC return. Otherwise, the Smart Off button may not work in the event that AC power is removed from the system and later restored.

The BIOS Implementation interoperates with Always Ready technology via the Always Ready driver extensions, which will be discussed below in greater detail below. Because the Smart Off button is implemented as a HID-compliant sleep button, power management functions recognize the HID usage code for system control and instruct the system to enter the system state which is specified in the power options of the control panel. In order for an Always Ready system to perform a different action on this button press, the Always Ready drivers intercept the button-press event, and then redirect the event to an Always Ready policy driver.

The Always Ready policy driver communicates to the system BIOS 133 through an Always Ready ACPI driver. As one of ordinary skill in the art would recognize the names for the driver extensions, services and methods used herein are for exemplary purposes and are not intended to limit the scope of the present invention. The Always Ready ACPI driver executes an ACPI control method (ARDY) which notifies the BIOS of the transition to and from Smart Off. In order for the Always Ready ACPI driver to communicate a Smart Off request to the BIOS to transition between on and Smart Off, this driver calls the ARDY control method through, e.g., ACPI.SYS. This is done if a device is created in the ACPI namespace of the BIOS, for which the Always Ready ACPI driver can be loaded. Once the Always Ready ACPI driver is loaded for the new device, it sends an IOCTL to ACPI.SYS to run the ARDY control method.

The name and hardware ID of the device to be created in the ACPI namespace, as well as an exemplary ARDY control method is as follows:

```
// Define smart off device
Device(\_SB.SOFF){
    Name(_HID, "ARY0001")    // Always Ready device
    Method(ARDY, 1){
                            // Add control method here
    }
}
```

A Light Emitting Diode (LED) which communicates the active power state of the system should also be able to represent the Smart Off state in addition to all of the supported ACPI power states. The connection of the LED to a Smart Off compliant system is physically connected the same way as a power LED to support an ACPI fixed power button. However, two LEDs may be necessary for the system if both an ACPI fixed power button in addition to the Smart Off button is present on the system. System state for each of these LEDs should match at all times, regardless of system state.

The Smart Off button LED utilizes the System Status object (_SST) as defined in the ACPI namespace, to properly indicate whether the system is in the Smart Off state or not. When the ARDY control method is executed (thereby indicating that the system is transitioning to Smart Off), the BIOS should change the _SST object from the working state of "1" to the sleeping state of "3". When this control method is run again to wake the system from the Smart Off state, the value of the _SST object should be changed back to the working state of "1".

The Power Supply used with the Always Ready computing device can range in implementation as long as the acoustics requirements noted above, i.e., the fans may be stopped when the device is in the Smart Off state. Many system factors should be taken into consideration for the power supply such as power draw, component layout, chassis design, as well as the selection of system components such as the CPU and graphics card. While these factors will vary from system to system, the following areas are considered when choosing, or designing a power supply for an Always Ready computing device: fan control, heat sink design, and operating efficiency.

While turning the fans off with Smart Off is preferred, it may be unreasonable to do so, depending on the system factors mentioned in the list above. As an alternative, it may be more reasonable to have a high level of fan control of the power supply, enabling the fan to run at a silent speed when in the Smart Off state. Whether the power supply fan turns off or spins a slower speed, when going into Smart Off, the control of the fan itself must be accomplished in some manner. Fan control can be accomplished by running Always Ready software on the computing device, through the BIOS, or can be managed by the power supply itself.

Fan operation of a power supply is normally controlled through the power supply itself, either running the fan at a predetermined speed (voltage) constantly when the PC is on, and turning the fan off when the system is sleeping or off. Because an Always Ready system is in S0 substantially 100% of the time, a typical power supply has no mechanism to determine when the system transitions to and from Smart Off. Special modifications need to be made to a power supply that is designed to work optimally with Always Ready technology, as will now be described.

Fan speed control can be exposed to the system through the FanC signal, which is defined in section 4.3 of the ATX Specification, version 2.2. A General Purpose I/O (GPIO) header is exposed on the motherboard to which the FanC signal line from the power supply connects. In addition, a device driver may be used with the Always Ready policy driver to control the fan when transitioning to and from Smart Off. This device driver is implemented to communicate directly with the GPIO that the FanC signal is connected to. Alternatively, the GPIO to control the power supply fan can be controlled through the BIOS rather than through a device driver. Alternatively, the system designer may choose to use the MICROSOFT POWER SENSE technologies Power Supply, which provides FanC/FanM fan control.

Fan speed control of the power supply may also be accomplished through the environmental controller function of the motherboard's Super I/O chip. Usually, these controllers have multiple fan outputs which can be used to control the fan of the power supply.

It is noted that different methods for fan control of the power supply may be implemented. For example, in the event that a thermal condition arises in the power supply, the power supply must also be designed to override the fan control. This is necessary because the power supply does not communicate thermal information to the system.

In order for the power supply to be silently cooled while in Smart Off, it is necessary that the power supply heat sinks should be designed with this goal in mind. Thermal analyses indicated that the stock heat sinks provided on the power supply main PCA would not be adequate under either forced or natural convection conditions. Additionally, these stock heat sinks were designed to fit in a much tighter enclosed area.

Figure 6:
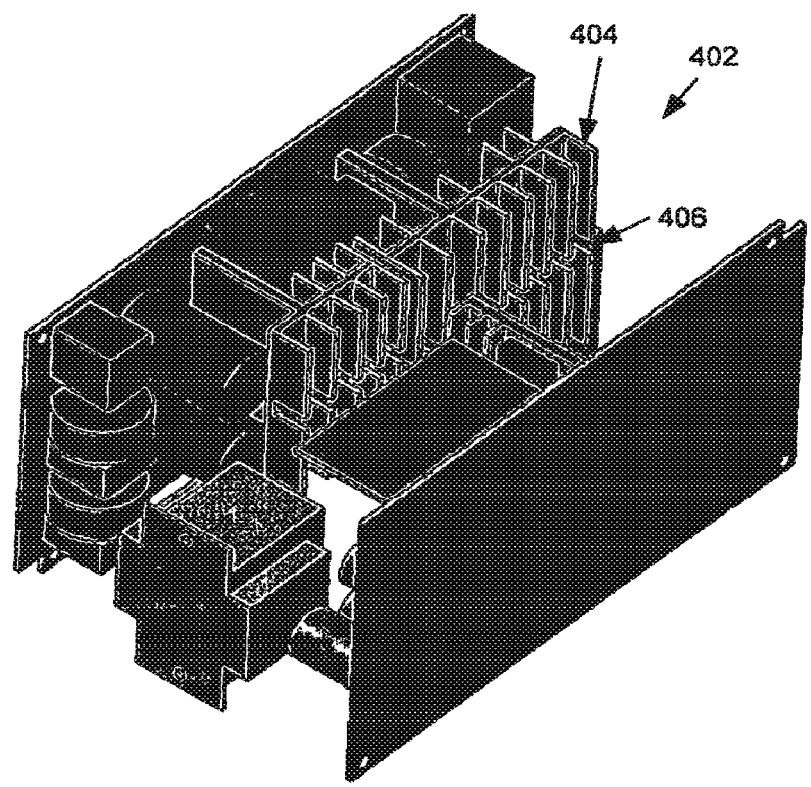
FIG. 6 is a view of a heat sink for use with a power supply.

Referring now to FIG. 6, there is illustrated a power supply heat sink 402 designed to passively dissipate the generated heat of the power load in an Always Ready computing device. The physical size of this heat sink is maximized to fit in the available space within the system enclosure, while leaving clearance for board-mounted components, wiring, and surrounding geometry. Fin orientation 404 matches the direction of prevailing airflow in through the power supply, and crosscuts 406 help induce airflow turbulence. This heat sink is anodized in a black color to help maximize the transfer capability of radiative heat.

The nature of power supply designs is such that optimum efficiency is achieved when the power supply is running at full load. Table 1 shows the efficiency of a power supply rated for a 200 watt DC load when running at full capacity:

TABLE 1

| 100% Load | | | |
|---|---|---|---|
| AC Inputs | | | |
| V (Volts) | | | 225.00 |
| I (Amps) | | | 1.50 |
| Power (W) | | | 270.00 |
| PF | | | 0.79 |
| DC Outputs | Volts | Current | Power |
| 3.3 V | 3.28 | 2.08 | 6.82 |
| 5 V | 5.13 | 11.08 | 56.86 |
| 12 V | 11.83 | 10.09 | 119.36 |
| 5VSB | 5.07 | 1.54 | 7.80 |
| Continuous DC power | | | 190.85 |
| Power Dissipation in PSU: | | | 79.15 |

As indicated in Table 1, in order to deliver 190.85 watts of continuous DC power to the PC, the power supply is capable of an AC input of 270 watts to accommodate the loss of 79.15 watts, which is due to the power dissipation from converting AC to DC. This equates to a rated efficiency of the power supply at 71% at 100% load. In contrast, when a power supply load is significantly lowered, the loss in the power supply increases. Table 2 demonstrates the efficiency of a power supply rated for a 200 watt DC load when running at 20% load:

TABLE 2

| 20% Load | | | |
|---|---|---|---|
| AC Inputs | | | |
| V (Volts) | | | 223.00 |
| I (Amps) | | | 0.39 |
| Power (W) | | | 68.00 |
| PF | | | 0.76 |
| DC Outputs | Volts | Current | Power |
| 3.3 V | 3.31 | 2.08 | 6.89 |
| 5 V | 5.17 | 0.00 | 0.00 |
| 12 V | 11.77 | 1.88 | 22.13 |
| 5VSB | 5.08 | 1.52 | 7.73 |
| Continuous DC power | | | 36.75 |
| Power Dissipation In PSU | | | 31.25 |

As indicated in Table 2, in order to deliver 36.75 watts of continuous DC power to the PC, the power supply must provide an AC input of 68 watts to accommodate the loss of 31.25 watts, which is due to the power dissipation from converting AC to DC. This equates to an efficiency of 54% at 20% load. By increasing the operating efficiency of the power supply from 71% (as indicated in Table 1), the loss at lower operating levels will decrease significantly. This will result in higher power savings for the end user, as well as a thermal design for the power supply that will be able to more easily accommodate passive cooling when in Smart Off.

When the ARDY control method is run to notify the BIOS that the system is transitioning between on and Smart Off, the BIOS can take the appropriate action to control the power supply fan, depending on the value of the ARDY control method. This is typically achieved through a Super I/O chip (SIO) in the system that monitors temperature information for the CPU and system, and has multiple fan control points. The SIO chips with smart fan control are capable of varying fan speed based on values which are configured in fan and temperature control registers.

An aspect of the Always Ready design is the ability of the CPU to run at a lower frequency and voltage resulting in a lower power state when the system goes into Smart Off. This ability significantly lowers the power draw when in Smart Off, resulting in a much smaller thermal envelope for the CPU which can be dissipated passively without the need to spin the fan.

The CPU related hardware to design an optimized Always Ready PC are as follows: a CPU that supports ACPI processor performance control, and a custom heat sink design. A processor that supports processor performance states, as defined in section 8.3.3 of the Advanced Configuration and Power Interface Specification, allows the CPU to enter a lower power consumption state. This is typically achieved through the modification of the frequency (CLK) and voltage (VDD) of the processor. Alternatively, the processor may implement stop clock throttling, as defined in section 8.1.1 of the ACPI specification, to increase the duty value of the clock off time of the processor. This has the same effect as lower the frequency, although the voltage is not lowered meaning power savings is not as significant as implementing processor performance control.

For exemplary purposes, in an AMD ATHLON 64 processor Table 3 shows CPU temperatures, system power consumption, and CPU utilization for different scenarios when in Smart Off.

TABLE 3

| Scenario | CPU Temperature | System Power Consumption | CPU Utilization |
|---|---|---|---|
| Playing music | 48/56 degree | 59-61/59-61 watts | 4-10% |
| Download from Internet Record Live TV | 49/58 degree | 59-61/60-64 watts | 4-10% |
| File serving Playing Music Windows Update | 50/59 degree | 59-61/66-71 watts | 12-18% |
| Burn CD record TV web session playing music | 49/57 degree | 59-61/71-80 watts | 40-47% |

Because conventional heat sinks that fit with the appropriate motherboard are designed to work under forced convection using an integrated cooling fan, these heat sinks have geometry (pins, closely spaced fins, folded sheet metal fins, and so on) that maximizes mass and surface area for best thermal conduction under forced convection conditions. However, conventional heat sinks indicated do not perform well under natural convection conditions because air tends to travel around, not through, the tightly spaced fins. Additionally, integrally mounted fans tend to insulate the heat sink when the fan is not providing forced airflow.

Figure 7:
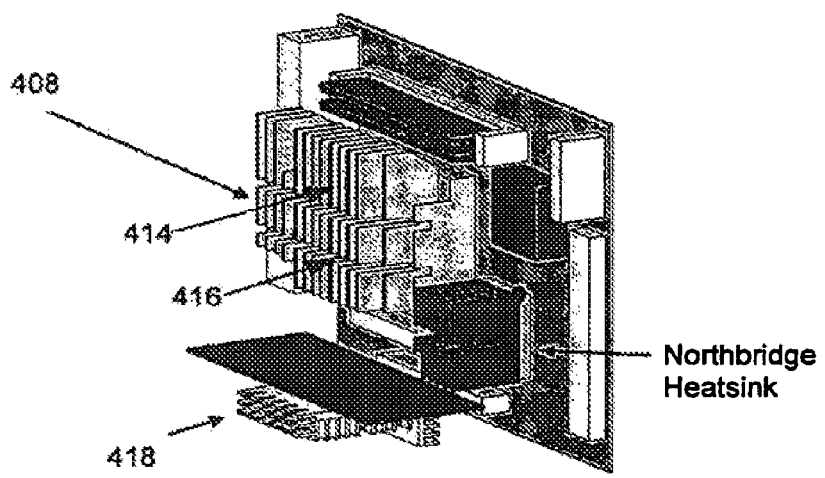
FIG. 7 is a view of a heat sink for use with a CPU.

Some fan-less heat sinks are available commercially, however they are far too large to fit in the limited space available in the typical computing device. Thus, a design is required that has both good thermal performance under both natural and forced convection conditions. Such a design is shown in FIG. 7.

Because the design of the CPU heat sink 408 has high thermal conductivity, a copper base 410 is utilized to distribute heat away from the processor chip. However, copper is heavy, expensive, and not as easy to extrude during the manufacturing process. To minimize these drawbacks, the outer portion 412 of this heat sink design consists of aluminum fins bonded to the copper base, which provide the surface area and thermal mass required to dissipate heat into the air. These heat sink fins 414 are spaced relatively far apart to allow for good conduction under natural convection situations. Additionally, the aluminum portion of this heat sink extends past the copper base to maximize thermal mass and surface area. Enclosure inlet/outlet and fan deflector geometry is also adjusted to provide the best cooling scenario under forced convection.

The ideal physical size of this heat sink was determined by maximizing the size of the overall geometry to fit in the available space within the system enclosure, while leaving clearance for motherboard-mounted components and wiring. The copper base size was chosen to fit the profile and mounting hole layout specified by the AMD ATHLON 64. The thickness of this base is selected in such a way that the aluminum portion of the heat sink (mounted to the outer surface of the copper portion) could extend over the motherboard, while still clearing nearby components. This provides a simple, flat geometric transition area, allowing for simple and low-cost manufacturability.

The finned aluminum geometry above the copper heat sink base was designed to maximize the available space above the motherboard, which provides the most surface area and thermal mass possible, given the overall configuration of the computing device's enclosure. Fin spacing is selected to allow standard machine tooling to cut the heat sink fins without requiring special tooling or processes (such as EDM machining). This design provides a high-aspect ratio fin geometry, spaced relatively far apart to provide good heat transfer under both forced and natural convection conditions, as described above. Additionally, a thin cross-cut 416 was made perpendicular to the fin orientation to provide an airflow "interruption" which helps to induce airflow turbulence, hence increasing the heat transfer capability of the heat sink.

The aluminum portion of the heat sink is anodized in a black color to help maximize its radiative heat transfer capability. Black anodize has thermal emissivity which is several times greater than bare aluminum. This improved heat transfer efficiency is especially important when using the convection cooling mode.

An Always Ready compliant system BIOS implements processor performance control, as defined in section 8.3.3 of the Advanced Configuration and Power Interface Specification. This enables the Always Ready user-mode service to execute the NTPowerInformation API to put the CPU into its lowest support P-state when going into Smart Off.

CPU fan control is achieved through the notification to the system BIOS that the system has entered Smart Off by the ARDY control method. The BIOS then takes the appropriate action to turn the fan off. Thermal override must be taken into consideration, however, to ensure that even in Smart Off, that CPU temperature does not rise to levels beyond the manufacturer's recommended limit. This functionality is typically achieved through a Super I/O chip in the system that monitors temperature information for the CPU and system, and has multiple fan control points. The SIO chips with smart fan control are capable of varying fan speed based on values configured in fan and temperature control registers.

In many systems, the graphics card may consume nearly as much power as the CPU when in use. This poses a difficult thermal challenge to solve when the system enters Smart Off. However, since the user is not actively using the display when the system is in Smart Off, the need for high graphics performance is not necessary. This allows the graphics vendor the possibility to aggressively manage the GPU of the card as necessary when entering Smart Off. In addition, heat sink design can be taken into consideration to develop a solution which can be passively cooled when in Smart Off.

Figure 8:
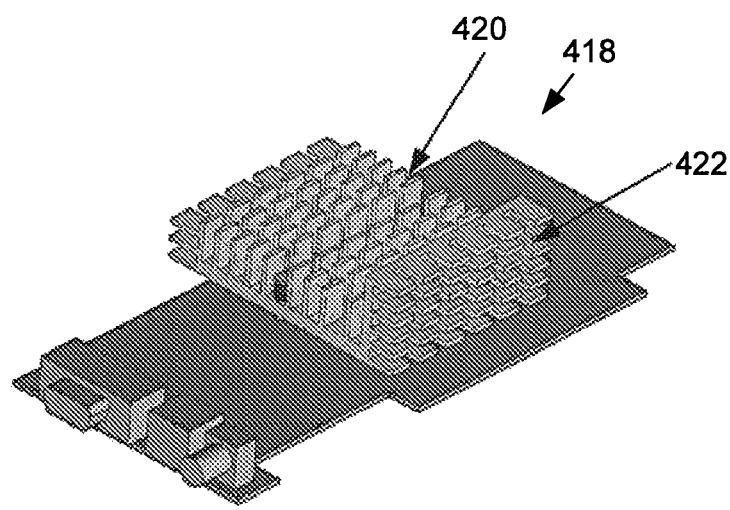
FIG. 8 is a view of a heat sink for use with a graphics card.

In order to ensure that the GPU temperature did not rise higher than the manufacturer's published specifications during Smart Off, a heat sink 418 design as shown in FIG. 8 may be used. This design is used where GPU throttling and fan control are not implemented. In addition, the stock heat sink provided with most graphics cards do not provide adequate heat transfer characteristics. In particular, the video card is mounted with the heat sink facing downward in an area that was not in the direct path of most of the airflow in the system. Additionally, the orientation of the fins 420 of the stock heat sink was perpendicular to the prevailing airflow in that area of the enclosure.

As with the CPU heat sink, the physical size of this heat sink is maximized to fit in the available space within the system enclosure, while leaving clearance for board-mounted components, wiring, and surrounding geometry. Fin orientation better matches the direction of prevailing airflow in that area of the enclosure, and cross-cuts 422 help induce airflow turbulence. This heat sink is also anodized in a black color to help maximize radiative heat transfer capability.

Software Implementation

Figure 9:
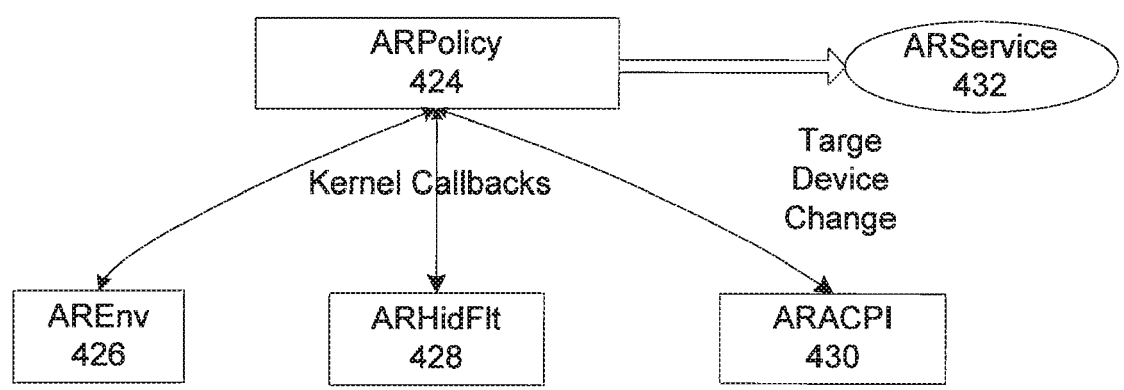
FIG. 9 is an overview of the software components of the present invention.

A set of Always Ready Extensions are managed via a suite of drivers and a user-mode services. The block diagram in FIG. 9 illustrates these software components and their logical relationship to each other. Rectangular boxes are drivers and ARPolicy, ARHidFlt and ARACPI are not specific to any particular hardware implementation. The AREnv driver is partially hardware-dependent. The ARService is a user-mode Always Ready service. The service is not hardware dependent.

In WINDOWS operating systems, all drivers are standard kernel-mode WDM drivers. All the drivers in the diagram are instantiated through standard PnP means, either as a result of the PCI bus driver associating the driver with a given VID/DID, as a filter driver, or as root enumerated device. The user-mode service is started during system boot, at the typical system service start time.

Each of the elements in FIG. 9 will now be described. The ARPolicy driver 424 (or other applicably named driver) is responsible for collecting information from other Always Ready drivers and cooperating entities. ARPolicy 424 uses the information to determine the system's Always Ready state. This state information is then distributed by ARPolicy to all cooperating entities throughout the system. The AREnv driver 426 is provided as an example of how to support any specialized hardware that needs to be informed of the changes in the system's Always Ready state. The ARHidFlt driver 428 is the HID filter driver. When the system is in Smart Off, this driver "locks" the USB keyboard (by discarding all user keystrokes) and USB mouse (by discarding mouse movement notifications). This driver also detects a predefined key sequence that is used to toggle to and from Smart Off and on (an alternative to the Smart Off button). The ARACPI driver 430 claims the Always Ready specific device (if one exists) that is defined within the system's ACPI name space. The ARACPI driver 430 calls a specific method that is defined in this device's ACPI name space (directly below the device) whenever the system enters or leaves Smart Off state. The ARService 432 is the user-mode service that performs Always Ready operations that are more easily implemented in user mode. These operations include: powering down the main video display, muting the audio, pausing audio playback that is in progress, land reducing the CPU speed. These operations may be accomplished using conventional functions. The specific functions ARService 432 performs on entrance to S0-Looks-Off state is controlled by registry keys, as defined below.

The communication between ARPolicy and integral kernel-mode components will now be described. ARXxxx drivers (i.e., drivers to control components that are under the direction of ARPolicy) generally will not take autonomous actions to change their states as a result of hardware status changes or events that they internally detect. Rather, changes in hardware status identified by an ARXxxx driver will result in that driver generating one or more event notifications to the ARPolicy Driver. The ARPolicy driver integrates information collected from the various components throughout the system and uses this information to define the system's current Always Ready state. ARPolicy communicates any changes in the system's Always Ready state to the other ARXxxx drivers using command notifications. The ARXxxx drivers use information they receive from ARPolicy about the current Already Ready system state to manage their control points.

Communication between ARPolicy and the other ARXxxx drivers is accomplished by means of a pair of named executive callbacks. The first is an "Event" callback. This callback (named ARPC_EVENT_CALLBACK_NAME) is notified by an ARXxxx driver to send system status reporting information to ARPolicy. Each ARXxxx driver (other than ARPolicy) opens this callback, and uses it for event notification. ARPolicy opens this callback and registers a callback routine which will be called as a result of each notification.

The second is a "Command" callback. This callback (ARPC_COMMAND_CALLBACK_NAME) is notified by ARPolicy when it has a command to send to one or more of the ARXxxx drivers. Each ARXxxx driver (other than ARPolicy) opens this callback and registers a callback routine, which is called as a result of ARPolicy notifying the callback.

Kernel callbacks are preferable as the main communication method because they are relatively lightweight yet can provide a 1-to-many (broadcast type) communication mechanism. Additionally, notifications pass two arguments to the callback routine which provides significant flexibility. Because callback notifications are processed synchronously, all drivers in the Always Ready suite will process their callbacks quickly and without blocking. It is also preferable that communication in this system is between ARPolicy and one of the other ARXxxx drivers. ARXxxx drivers never communicate directly with each other.

When a callback is notified, whether by ARPolicy or any of the other ARXxxx drivers, two 32-bit arguments are passed: an AR_COMMAND structure, and an additional 32-bit value that is referred to herein as Value2. The use of Value2 depends on the contents of AR_COMMAND. The AR_COMMAND structure will be used to communicate between ARPolicy and the other ARxxx drivers.

Figure 10:
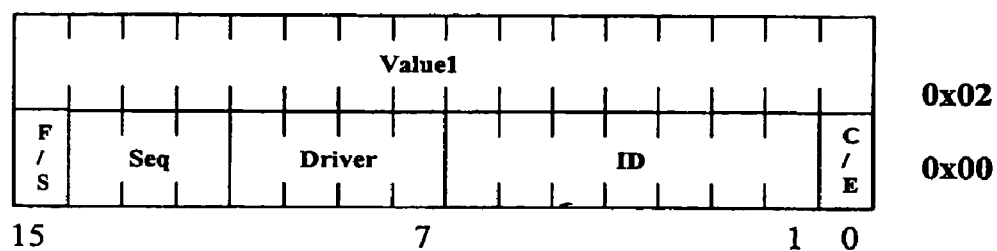
FIG. 10 is an exemplary command structure of the AR_COMMAND.

The format of an exemplary structure is shown in FIG. 10, where the AR_COMMAND field definitions are as follows:

C/E: Set to indicate that the AR_COMMAND structure describes a command and that this AR_COMMAND originates from ARPolicy and is primarily directed to the driver identified in the Driver field. Clear to indicate that the AR_COMMAND structure describes an event primarily targeted to the ARPolicy driver, and that this AR_COMMAND originated from the ARXxx driver identified by the Driver field.

ID: Contains a 7-bit value that uniquely identifies a particular command or event.

Driver: If C/E equals 1 (indicating a command), Driver contains the AR_DRIVER number of the driver that is the primary target for this command. When C/E equals 1 and Driver is 0xF (AR_DRIVER_ALL), the target is all ARXxxx objects. If C/E is 0 (indicating an event), Driver contains the AR_DRIVER number of the driver generating the event.

Seq: If C/E equals 1 (indicating a command), this is the command sequence number. If C/E equals 0 (indicating an event), this is either: (1) the sequence number from the Seq field of a previously received command, to indicate that this event is a response to a specific command, or (2) 0 to indicate that this event is not generated in response to a previously received command.

F/S: When C/E equals 0, F/S is set to indicate that the AR_COMMAND structure describes an event that is at least partially in error. The data in Value1 (see below) may be partial or incorrect. This bit is most typically set when an ARXxxx driver attempts to process a command from ARPolicy, but fails. In this case, the command ID contains the command from ARPolicy.

Value1: Contains data (such as a command argument or event value) associated with and defined by the specific command or event indicated in ID.

Several examples of event IDs are as follows:
ARPC_EVENT_ENTER_SMARTOFF—Value1 and Value2 are both zero for this event.
ARPC_EVENT_EXIT_SMARTOFF—Value1 and Value2 are both zero for this event.

An exemplary command may be:
ARPC_COMMAND_SET_ALWAYS_READY_SYSTEM_STATE—Value1 is zero, and Value2 contains an ARPOLICY_STATE structure.

Whenever ARPolicy receives an event notification, it evaluates the effect of the event on the Always Ready state of the system. If the event results in a change in the system's Always Ready state, ARPolicy will build an AR_COMMAND with the command ID ARPC_COMMAND_SET_ALWAYS_READY_SYSTEM_STATE, and will pass the system's new Always Ready state, as described by an ARPOLICY_STATE structure, in Value2 when the command notification is performed.

Figure 11:
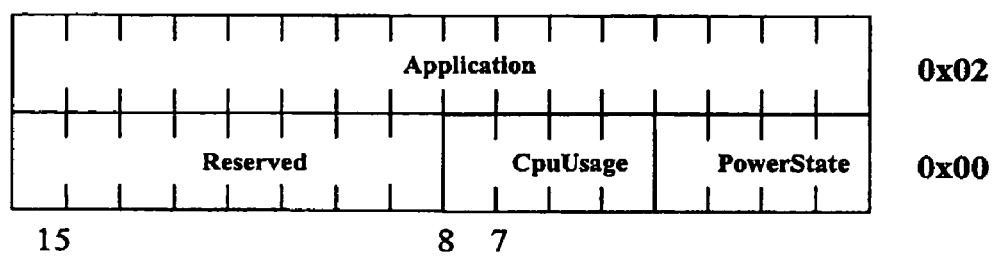
FIG. 11 is an exemplary command structure of the ARPOLICY_STATE.

The format of an exemplary ARPOLICY_STATE structure is shown in FIG. 11. As show in FIG. 11, the ARPOLICY_STATE field definitions are as follows:

PowerState: The system's current S-state (S0-S5), or S0-Looks-Off.

CpuUsage: The current CPU utilization percentage, in deciles (i.e. the values 1 through 10 meaning 10% through 100%).

Application: A bit mask, where each bit in the range of 0-14 represents a specific "Always Ready Aware" application that is active. The bit number is the index into an array of names of Always Ready Aware applications in the registry. Bit 15, when set, indicates that one or more additional "Always Ready Aware" applications are currently active.

Reserved: These fields are reserved for future use and are ignored.

Cooperating kernel-mode entities, other than the ARXxxx drivers, may also communicate changes in state information to ARPolicy. They do this by opening the Event callback (ARPC_EVENT_CALLBACK_NAME) and notifying this callback as previously described for ArXxxx drivers, passing an AR_COMMAND structure and additional DWORD argument (Value2). Because cooperating entities are not integral parts of the Always Ready software suite, they set the Driver field of the AR_COMMAND structure to DRIVER_OTHER, and the Seq and S/F fields to zero.

For example, a driver for a cooperating HID device might want to notify ArPolicy of the occurrence of a HID event that should cause the system to enter S0-Looks-Off state. The HID driver could accomplish this using code that looks something like the following:

```
AR_COMMAND smartOffEvent;
RtlZeroMemory(&smartOffEvent, sizeof(AR_COMMAND));
smartOffEvent.CorE = AR_COMMAND_CorE_E;
smartOffEvent.ID = ARPC_EVENT_ENTER_SMARTOFF;
smartOffEvent.Driver = DRIVER_OTHER;
smartOffEvent.Seq = 0;
smartOffEvent.SorF = 0;
ExNotifyCallback(
    DeviceExtension->SmartOffCallback,  // ptr to callback obj
        (PVOID)smartOffEvent,           // AR_COMMAND structure
        NULL);                           // No Arg2 for this
                                         AR_COMMAND
```

In the above example, DeviceExtension->SmartOffCallback contains a pointer to the previously opened callback object named ARPC_EVENT_CALLBACK_NAME). Because cooperating entities are not integrally designed members of the Always Ready software suite, it is preferred that they do not open the Command callback object (ARPC_COMMAND_CALLBACK_NAME). Such entities may, however, be notified of changes in the system's Always Ready state by registering for target device change notifications from ARPolicy. This is described elsewhere in this document.

ARPolicy communicates changes in the system's Always Ready state to user-mode components and both integral and non-integral cooperating kernel-mode components by sending custom target device change notification PnP events. WINDOWS operating systems identify target device change notification events using GUIDs. Always Ready defines two specific target device change notification events defined for communication with user-mode and other cooperating entities:

ARPOLICY_COMMAND_NOTIFICATION_GUID—When the event associated with this GUID is triggered, the custom data that is sent is the same 32-bit AR_COMMAND and 32-bit Value2 values described previously.

ARPOLICY_ALWAYS_READY_NOTIFICATION_GUID—When the event associated with this GUID is triggered, one byte of custom data is sent. A value of 0 is used to indicate that the system is in S0, a value of 1 indicates that the system is in S0-Looks-Off state.

Phases of Operation

As previously noted, the drivers developed as part of this project are fully compliant with WDM PnP and power management guidelines. The drivers are instantiated as follows:

ARPolicy—Root is enumerated as Root\ARPolicy.

AREnv—Root is enumerated as Root\AREnv.

ARHidFlt—Loads as an upper filter of the HID class driver.

ARACPI—Loads on ACPI-defined device, ACPI\PNPxxyy.

During system startup, all ARXxxx drivers other than ARPolicy will wait for ARPolicy to enable its interface (AR-POLICY_DRIVER_INTERFACE). Once ARPolicy's interface has been enabled, drivers that raise events that impact the system's Always Ready state will raise events to indicate the starting state of the system. These initial states will be used by ARPolicy to build the first ARPC_COMMAND_SET_ALWAYS_READY_SYSTEM_STATE command for the system. As soon as the above events have been received by ARPolicy, the first ARPC_COMMAND_SET_ALWAYS_READY_SYSTEM_STATE command will be issued, via both the command callback notification and GUID AR-POLICY_COMMAND_NOTIFICATION_GUID target device change notification. Prior to receipt of this command, individual ARXxxx drivers may set their devices to appropriate default states. During system startup, ARPolicy may or may not issue a custom target device change notification for ARPOLICY_ALWAYS_READY_NOTIFICATION_GUID. Thus, during startup elements utilizing this notification shall assume the system state to be S0.

During normal system operation, ARXxxx drivers and cooperating entities will interact with their hardware as appropriate. Each ARXxxx driver will periodically, but no less than every 5 seconds, determine the state of its component and transmit any change materially affecting the system's Always Ready state to ARPolicy by raising an event.

ARPolicy will typically issue ARPC_COMMAND_SET_ALWAYS_READY_SYSTEM_STATE commands (via callback notification and triggering the ARPOLICY_COMMAND_NOTIFICATION_GUID and target device change event) only as a result of a change in the system's Always Ready state. However, it is preferable that components be able to accept receiving sequential, identical, ARPC_COMMAND_SET_ALWAYS_READY_SYSTEM_STATE commands.

To provide for a quality user experience, and feedback that's as close as possible to "real time", ARPolicy will trigger a custom target device change event with a ARPC_COMMAND_SET_ALWAYS_READY_SYSTEM_STATE command indicating a change in S0-Looks-Off state to ARPOLICY_COMMAND_NOTIFICATION_GUID on receipt of either an Enter Smart Off or Exit Smart Off event. This allows ARService and other such entities to perform human interface interactions as close to the time of the request as possible.

After a suitable period to collect any additional pending state changes, ARPolicy will issue the ARPC_COMMAND_SET_ALWAYS_READY_SYSTEM_STATE command with the new system state reflecting (at least) the change in S0-Looks-Off state. This command is sent via callback notification and ARPOLICY_COMMAND_NOTIFICATION_GUID custom target device change notification. Subsequently, a custom target device change notification is also sent to ARPOLICY_ALWAYS_READY_NOTIFICATION_GUID to indicate the new S0-Looks-Off state.

ARPolicy notifies most cooperating system components about the system's entry and exit from S0-Looks-Off state via a custom target device change event, identified by the GUID ARPOLICY_ALWAYS_READY_NOTIFICATION_GUID. While ARPolicy will typically trigger this target device change event only on a change of state, entities utilizing this event check the custom data byte included with this notification to see if there has indeed been a change in the S0/S0-Looks-Off state of the system and act accordingly.

Component Registry Values

The default behavior of the integral components in the Always Ready system may be tailored according to platform requirements. This is preferably done through the use of Registry entries. The Registry entries may be as follows:

KeyProcesses—list of executable image names that will cause the "CPU ceiling" to be lifted when the system is in Smart Off.

ProcessTimer—the time, in milliseconds, between ARPolicy polling intervals.

BlankDisplay—Boolean value indicating whether or not the display should be blanked when entering Smart Off.

PauseMedia—Boolean value indicating whether or not the currently open instance of a media player should be paused when entering Smart Off and resumed when exiting.

MuteAudio—Boolean value indicating whether or not the main audio should be muted when entering Smart Off.

ThrottleProcessor—Boolean value indicating whether or not the processor will be throttled to its lowest possible P-state when entering Smart Off.

EnterKeys—a list of HID pages and usages of keys that cause the system to ENTER Smart Off.

DontPassExitKeys—list of HID pages and usages of keys that should cause the system to EXIT Smart Off.

PassExitKeys—list of HID pages and usages of keys that should cause the system to EXIT Smart Off.

It is noted that the Smart Off functionality may be accomplished via an operating system kernel. The implementation within the operating system will generally consist of modifying power management policy to comprehend putting the system into a lower-power "S0" state when the power button is pressed, if the OS is configured by the user to do so. This would entail using existing mechanisms to lower power on the CPU (the same being used by the other two implementations), and implementing ACPI thermal zones in the BIOS to change fan behavior when going into the lower power S0 state. In addition, screen blanking, audio muting would also be handled through internal OS mechanisms, or through a service.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of providing a simulated off condition in a computing device via a set of software extensions, said method comprising:
providing a device driver for each component to be managed;
providing a policy driver to coordinate information from device drivers to determine a power state of said computing device;
receiving a signal to change the power state of said computing device;
instructing system components to change their respective power states in accordance with said signal;
if said signal is representative of a request to enter a low power state, reducing power consumption of said system components such that said computing device enters a simulated off state, wherein said computing device remains at a fully on and said system components remain enabled to run applications when the computing device is in the simulated off condition;
if said signal is representative to a request to enter a fully on power state, returning said system components to said fully on power state;
locking human interface devices by discarding inputs; and
detecting a predefined input sequence, said predefined sequence being said signal.

2. The method of claim 1, further comprising said policy driver periodically polling each device driver.

3. The method of claim 1, wherein a system service is provided, said system service:
instructing processors within said computing device to clock-down to a lowest state;
discontinuing a display signal to turn off a monitor;
reducing a power supply output;
turning off cooling fans; and
indicating that the computing device is in the simulated off condition.

4. The method of claim 1, further comprising:
monitoring for applications that require said system components to utilize more power than said low power state; and
bringing predetermined ones of said system components out of said lower power state to process the applications that require more power.

5. The method of claim 4, further comprising returning the computing device to said simulated off condition after the applications that require said system components to utilize more power have completed.

6. The method of claim 1, wherein the computing device is in an ACPI S0 state when the computing device is in said simulated off condition, and
wherein the computing device enters an ACPI S3 state after a predetermined period of time.

7. A method of producing a simulated off condition in a computing device when the computing device is in an ACPI S0 state, the method comprising:
providing a device driver for each component to be managed;
providing a policy driver to coordinate information from device drivers to determine a power state of said computing device;
receiving a signal to change the power state of said computing device;
instructing system components to change their respective power states in accordance with said signal;
if said signal is representative of a request to enter a low power state, reducing power consumption of said system components using ACPI methods such that said computing device enters a simulated off state, wherein said computing device at a fully on and said system components remain enabled to run applications when the computing device is in the simulated off condition;
if said signal is representative to a request to enter a fully on power state, returning said system components to said fully on power state using ACPI methods;
locking human interface devices by discarding inputs; and
detecting a predefined input sequence, said predefined sequence being said signal.

8. The method of claim 7, said reducing power consumption of said system components is performed by a system service, said method further comprising:
instructing processors within said computing device to clock-down to a lowest state;
discontinuing a display signal to turn off a monitor;
muting system audio;

pausing media playback;
reducing a power supply output;
turning off cooling fans; and
indicating that the computing device is in the simulated off condition.

9. The method of claim 8, further comprising:
monitoring for applications that require said system components to utilize more power than said low power state; and
bringing predetermined ones of said system components out of said lower power state to process the applications that require more power.

10. The method of claim 9, further comprising returning the computing device to said simulated off condition after the applications that require said system components to utilize more power have completed.

* * * * *